2,789,103

RUBBER STABILIZED WITH HYDROCARBON TIN COMPOUNDS

Elliott L. Weinberg, Long Island City, N. Y., and Louis A. Tomka, Westfield, N. J., assignors to Metal & Thermit Corporation, New York, N. Y., a corporation of New Jersey No Drawing. Application January 29, 1954, Serial No. 407,151

21 Claims. (Cl. 260—45.75)

The present invention relates to the stabilization of elastomers against the deleterious effects of aging, and especially the stabilization of rubbery compositions of the class consisting of natural rubber and synthetic polymers. Elongation, tensile strength, modulus, tackiness, etc., as well as other properties of elastomers are adversely affected by aging in the absence of stabilizers normally termed rubber antioxidants.

We have discovered that an organotin compound having the structural formula

is an effective anti-oxidant for natural and synthetic rubbery compounds.

In the above formula R is a hydrocarbon group, Q is a group VIb element in the periodic table of the elements, and $n$ is an integer. $n$ may be 1 indicating a monomeric product or it may be greater indicating a polymer. When Q is sulfur there is reason to believe that $n$ is usually 3, that is, that the product is a cyclic trimer. R may be more specifically defined as a univalent organic radical, such as an alkyl, aralkyl or aryl radical, including methyl, ethyl, butyl, propyl, lauryl, tolyl, phenyl, phenylethyl, diphenyl or benzyl; it is not necessary that each R group be identical. Q, more specifically, is selected from the group consisting of sulfur, selenium and tellurium except that in polymeric compounds oxygen may replace some sulfur atoms to produce oxysulfides such as for example

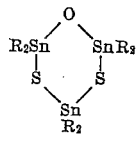

or

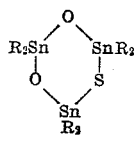

The hydrocarbontin sulfides are conveniently made by passing hydrogen sulfide through a suspension of hydrocarbontin oxides in an inert solvent such as toluene. When not enough hydrogen sulfide is passed there is produced a mixture of oxysulfide species. This mixture may be used without separation as an effective rubber stabilizer or antioxidant.

The hydrocarbontin selenides and tellurides may be made by the reaction of a hydrocarbontin halide with alkali metal selenide or telluride. For instance dimethyltin selenide may be prepared by dissolving 22 grams (0.1 mole) of dimethyltin dichloride in 50 ml. water and mixing with a solution of 12.5 grams (0.1 mole) of sodium selenide in 150 ml. air free water. The resulting mixture may then be filtered and the resulting white precipitate washed and dried in a vacuum oven. For hydrocarbontin chlorides other than methyl, the chlorides would be dissolved in ethanol instead of water.

Dibutyltin telluride may be made by passing hydrogen telluride, generated by the action of dilute hydrochloric acid on aluminum telluride, into a slurry of dibutyltin oxide in toluene, until substantially all of the dibutyltin oxide is consumed. The solution may then be heated to expel excess hydrogen telluride. The solvent may then be distilled off, in vacuo, together with the water formed by the reaction, leaving a residue of solid dibutyltin telluride.

Compounds of the above type have been demonstrated to be extremely effective. Their effectiveness is illustrated by their stabilizing ability at exceptionally low concentrations and are effective at .05% to 5% based on the weight of the rubber with a preferred range of .1 to 1% stabilizer based on the weight of the rubber.

These stabilizers are non-staining, and do not cause discoloration of rubber stocks as other anti-oxidants commonly do. This permits the manufacture of stable white stocks.

The stabilizers disclosed herein can be effectively used as anti-oxidants with elastomers specifically with rubbery materials of the class consisting of (a) natural rubber, (b) rubber-like copolymers of 1,3 butadiene and styrene (GR–S type), (c) rubber-like copolymers of 1,3 butadiene and acrylonitrile (nitrile type) and (d) rubber-like homopolymers of chloroprene (neoprene type).

The organotin compounds may be milled into the rubbery materials defined above, without other additions, for the purpose of preventing degradation during storage. More commonly they will be incorporated with other materials during compounding.

Any suitable compounding formulation may be employed. A specific example of a natural rubber composition, in which the organotin derivatives described are effective as anti-oxidants is as follows:

| | Parts by weight |
|---|---|
| Thin, pale crepe | 100.0 |
| Zinc oxide (lead-free) | 5.0 |
| Stearic acid | 1.0 |
| Titanium dioxide (anatase) | 10.0 |
| Insoluble sulfur | 3.0 |
| Benzothiazyl disulfide | 1.0 |
| Tetramethylthiuram disulfide | 0.1 |

To this composition may be added any of the organotin compounds coming under the general formula set forth above, in the proportions of 0.05% to 5% by weight, based on the weight of the rubber ingredient of said composition and preferably in the approximate 0.1% level. This compounded rubber composition containing the stabilizer is worked and blended by conventional techniques and vulcanized at 275° F. for twenty minutes in an hydraulic press.

The effectiveness of the organotin compound described as an anti-oxidant is indicated by the following test results carried out with the specific rubber composition described above containing anti-oxidant in the amounts and manner shown below.

Example 1. No anti-oxidant
Example 2. 0.1 pt. dimethyltin sulfide
Example 3. 0.1 pt. dibutyltin sulfide
Example 4. 0.25 pt. dilauryltin sulfide
Example 5. 0.25 pt. diphenyltin sulfide
Example 6. 1.00 pt. dibutyltin sulfide
Example 7. 0.1 pt. dibutyltin oxysulfide
Example 8. Commercial anti-oxidant The test methods employed to determine the anti-oxidant properties consisted of (1) outdoor exposure and (2) the Oxygen Bomb Test—ASTM Procedure D-572-48. The outdoor exposure test samples were examined for tackiness, surface checking and discoloration. The oxygen bomb test samples were examined for changes in tensile strength, elongation and modulus by means of standard equipment.

*Outdoor exposure—60 days*

| Sample | Color | Tackiness | Surface Checking |
|---|---|---|---|
| Ex. 1 | No discoloration | Pronounced | Pronounced. |
| Ex. 2 | ....do | None | Very slight. |
| Ex. 3 | ....do | ....do | Do. |
| Ex. 4 | ....do | ....do | Do. |
| Ex. 5 | ....do | ....do | Do. |
| Ex. 6 | ....do | ....do | Do. |
| Ex. 7 | ....do | ....do | Do. |
| Ex. 8 | Discolored | Slight | Pronounced. |

*Oxygen bomb test—4 days @ 70° C.*

| Sample | Modulus (p. s. i.) 200% Elongation | | (p. s. i.) Tensile Strength | | Percent Elongation | |
|---|---|---|---|---|---|---|
| | Orig. | Aged | Orig. | Aged | Orig. | Aged |
| Ex. 1 | 270 | 270 | 2,980 | 1,300 | 600 | 500 |
| Ex. 2 | 290 | 300 | 3,000 | 2,450 | 600 | 525 |
| Ex. 3 | 290 | 300 | 3,050 | 2,500 | 600 | 500 |
| Ex. 4 | 295 | 315 | 3,050 | 2,500 | 625 | 525 |
| Ex. 5 | 295 | 300 | 3,100 | 2,450 | 610 | 525 |
| Ex. 6 | 280 | 300 | 3,050 | 2,400 | 625 | 525 |
| Ex. 7 | 285 | 310 | 2,950 | 2,600 | 600 | 530 |
| Ex. 8 | 250 | 315 | 3,210 | 2,400 | 645 | 525 |

Similar tests on GR-S rubber (1,3 butadiene-styrene) indicate that the stabilization of synthetic rubber with organotin compounds of the general type described, is just as pronounced as it is in the case of natural rubber.

Although the examples show the stabilizer used with natural rubber crepe and with coagulated GR-S (1,3 butadiene and styrene), incorporation of the stabilizer into latices is possible. The latices would then be processed in the usual manner.

The rubber composition to be stabilized may contain quantities of pigments to impart any desired color or decorative effect to the final product. The stabilizer will cause the rubber composition to maintain its color whether it is black, white or any other color.

While the invention has been described with reference to various samples and embodiments, it will be apparent to those skilled in the art that various modifications may be made, and equivalents substituted therefor, without departing from the principles and true nature of the invention.

What is claimed is:

1. A rubber composition comprising, as a basic ingredient, a rubbery polymer selected from the group consisting of natural rubber, copolymers of 1,3 butadiene and styrene, copolymers of 1,3 butadiene and acrylonitrile and homopolymers of chloroprene, and containing a stabilizing amount of a hydrocarbontin compound of formula

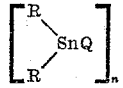

wherein R is a hydrocarbon radical selected from the group consisting of alkyl, aryl and aralkyl radicals, Q is a chalkogen element bonded only to tin, n is a positive small whole number, wherein when n is greater than 1, Q may represent different chalkogen elements and wherein Q is oxygen only in those compounds of said formula which also contain at least one other chalkogen.

2. A composition according to claim 1 wherein the stabilizer is present in the amount of about 0.05% to 5% by weight based on the rubber ingredients.

3. A composition according to claim 1 wherein the composition is cured.

4. A composition according to claim 1 wherein the chalkogen element, Q, is sulfur.

5. A composition according to claim 4 wherein the stabilizer is present in the amount of about 0.05% to 5% by weight based on the rubber ingredients.

6. A composition according to claim 1 wherein the chalkogen element, Q, is selenium.

7. A composition according to claim 6 wherein the stabilizer is present in the amount of about 0.05% to 5% by weight based on the rubber ingredients.

8. A composition according to claim 1 wherein the chalkogen element, Q, is tellurium.

9. A composition according to claim 8 wherein the stabilizer is present in the amount of about 0.05% to 5% by weight based on the rubber ingredients.

10. A rubber composition comprising, as a basic rubber ingredient, a rubbery copolymer of 1,3 butadiene and styrene, and containing a stabilizing amount of a hydrocarbon dialkyl tin sulfide.

11. A rubber composition according to claim 10 wherein the stabilizer is present in an amount of about 0.05% to 5% by weight based on the rubber ingredients.

12. A rubber composition comprising as a basic ingredient a rubbery copolymer of 1,3 butadiene and styrene, and containing a stabilizing amount of a hydrocarbon diaryl sulfide.

13. A composition according to claim 12 wherein the stabilizer is present in the amount of about 0.05% to 5% by weight based on the rubber ingredients.

14. A rubber composition comprising as a basic ingredient a rubbery copolymer of 1,3 butadiene and styrene and containing a stabilizing amount of a hydrocarbon dialkyltin oxysulfide.

15. A composition according to claim 14 wherein the stabilizer is present in the amount of about 0.05% to 5% by weight based on the rubber ingredients.

16. A rubber composition comprising, as a basic ingredient, a rubbery copolymer of 1,3 butadiene and styrene, and containing from .1% to 1% by weight of dibutyltin sulfide, based on the rubber ingredients.

17. A rubber composition according to claim 16 wherein the composition is cured.

18. A rubber composition comprising, as a basic ingredient, a rubbery copolymer of 1,3 butadiene and styrene and containing 0.25% by weight of diphenyltin sulfide, based on the rubber ingredients.

19. A composition according to claim 18 wherein the composition is cured.

20. A rubber composition comprising, as a basic ingredient, a rubbery polymer of 1,3 butadiene and styrene and containing 0.1% by weight of dibutyltin oxysulfide, based on the rubber ingredients.

21. The method which comprises curing the composition of claim 1.

References Cited in the file of this patent
UNITED STATES PATENTS

| | | |
|---|---|---|
| 2,310,449 | Lightbown et al. | Feb. 9, 1943 |
| 2,464,143 | Martinson et al. | Mar. 8, 1949 |
| 2,514,210 | Albert | July 4, 1950 |
| 2,514,221 | Albert | July 4, 1950 |
| 2,626,953 | Mack | Jan. 27, 1953 |
| 2,626,954 | Albert | Jan. 27, 1953 |